Patented Sept. 17, 1940

2,215,070

UNITED STATES PATENT OFFICE 2,215,070

METHOD FOR THE PRODUCTION OF MALEIC ANHYDRIDE

John Z. Miller, Newark, Del., assignor to Hercules Powder Company, Wilmington, Del., a corporation of Delaware No Drawing. Application May 11, 1938, Serial No. 207,331

2 Claims. (Cl. 260—343)

This invention relates to the manufacture of maleic anhydride by the catalytic partial oxidation of suitable organic compounds with an oxygen containing gas and more particularly to a method for the direct recovery of maleic anhydride from the gas mixture resulting from such oxidation.

Maleic anhydride has heretofore been produced by passing the vapor of a suitable organic compound, such as, for example, benzene, phenol, croton aldehyde, crotonic acid, furan, furfuryl alcohol, furfural, oxymethyl furfural, pyro-mucic acid, turpentine oil, cyclopentadiene, butylene, etc., admixed with a quantity of an oxygen containing gas, such as, air, in excess of that theoretically necessary for the partial oxidation of the organic compound, through a suitable contact mass such as, for example, vanadium oxide coated on a catalyst support and which is contained in a converter equipped with means for temperature regulation. The reaction is carried out at an elevated temperature which may be within, for example, the range of about 300° C. to about 550° C. The hot gas mixture issuing from the convertor contains maleic anhydride and various by-products of the reaction. Thus, the gas mixture resulting from the partial oxidation of benzene contains maleic anhydride, quinone, tars, water and other products of the partial oxidation of benzene, as well as carbon monoxide and carbon dioxide, resulting from the complete oxidation of a part of the benzene, unchanged benzene in small amounts, nitrogen, and oxygen from the excess of air used in the reaction.

The valuable product of this reaction has heretofore been recovered by scrubbing the gas stream from the converter with a liquid absorbent. For this purpose water has long been used and elaborate and costly processes for the recovery of the crude maleic acid and its subsequent conversion to purified maleic anhydride have been developed. Thus, U. S. 1,424,138 and 1,966,852 describe methods for the dehydration of crude maleic acid while U. S. 2,098,047 develops a procedure for recovering the crude acid from aqueous solutions. But despite these processes the handling of maleic acid presents troublesome corrosion problems and because of its easy conversion to fumaric acid always results in lowered yields of maleic anhydride.

More recently (Brit. 415,748) the use of organic liquid absorbents has been proposed. These have the advantage over water in that they recover a mixture of crude maleic anhydride and acid instead of crude acid. Thus, by following British 415,748 maleic anhydride may be obtained without passing through the step of maleic acid dehydration. However, the loss of absorbent by volatilization or its recovery from the gas stream is expensive because of the large volumes of gas handled. Another disadvantage of this process is the necessity for purifying the purification solvent. These items plus the additional liquid handling and storage combine to make the organic absorbent process unattractive. However, regardless of the economics of the organic absorbent process in relation to those of the water scrubbing process, the process I have developed for the recovery of maleic anhydride does not require a scrubbing liquid.

Now, in accordance with this invention, I provide a process in which a suitable organic compound is oxidized to maleic anhydride and the maleic anhydride recovered directly from the reacted gas mixture and in the absence of either an aqueous or an organic scrubbing medium, thereby avoiding the formation of maleic acid and its subsequent reconversion to maleic anhydride as heretofore practiced. I accomplish this by controlling the composition of the reacted gas mixture and by cooling it to a temperature below the condensation temperature of the maleic anhydride contained therein but above the dew-point of the water-vapor contained therein. The material which crystallizes out of the reacted gases by this method is maleic anhydride and not maleic acid. Contrary to the opinion heretofore held by the art, the maleic anhydride so crystallized does not react with the water-vapor in the gas stream. By avoiding the co-precipitation of the water-vapor as a liquid, reaction of the maleic anhydride to form maleic acid is almost entirely avoided. By this method I obtain directly, with no additional purification or fractionation steps, a product which is 97–99% maleic anhydride.

In carrying out my method, I prefer to recover maleic anhydride as a crystalline solid rather than as a liquid. I accomplish this by cooling the reacted gas mixture to a temperature below the condensation temperature of maleic anhydride and below its freezing point of about 52° C., but above the dew-point of the reacted gas mixture. The method in accordance with this invention is entirely satisfactory to condense maleic anhydride as a liquid at temperatures above its freezing point, but such condensation has several disadvantages. The liquid maleic anhydride tends to pick up color bodies from the gas stream. The crystalline maleic anhydride does not have this tendency. Furthermore, the separation of the maleic anhydride as a crystalline solid gives a purer product in that the crystallization itself acts as a purification step.

Crystalline maleic anhydride can be precipitated from gas mixtures at any temperature below about 52° C., provided the maleic anhydride content is in excess of that necessary for complete saturation at the temperature of precipitation and provided that the concentration of water-vapor is less than corresponds to saturation at the same temperature. However, such gas mixtures may be readily obtained under practical and efficient operating conditions, so that my process is of broad commercial application.

My process may be advantageously utilized in connection with any oxidation process which produces a hot gas mixture rich in maleic anhydride and containing small quantities of water-vapor. The particular organic compound oxidized may be any of those mentioned hereinbefore as suitable for use in the production of maleic anhydride. While I shall describe my invention with reference to the oxidation of benzene, it will be understood that the description applies as well to any process in which a suitable organic compound is oxidized to maleic anhydride.

Where I use the term "dew-point" it will be understood that I refer to the condensation temperature of water-vapor, and, thus, I am using the term in its narrow sense.

The process in accordance with this invention in its preferable form consists of contacting a mixture of benzene vapor and air with a suitable catalyst for the oxidation of benzene to maleic anhydride, as, for example, vanadium oxide on a suitable support, at an elevated temperature, while controlling the composition of the reacted gas mixture to contain maleic anhydride in amount substantially in excess of that necessary for 100% saturation of the gas mixture at the temperature of precipitation and water-vapor in amount such that the reacted gas mixture will have a dew-point substantially below the temperature of precipitation, and subjecting the reacted gas mixture to a temperature within the range between the dew-point of the gas mixture and 52° C., thereby precipitating maleic anhydride as a crystalline solid from the gas stream with substantially no co-precipitation of water. It will, of course, be appreciated that a temperature of condensation above 52° C. may be used, if crystalline maleic anhydride is not desired.

The concentration of maleic anhydride in the reacted gas mixture is dependent upon the efficiency of the reaction and upon the ratio of air to benzene utilized. The dew-point of the reacted gas mixture is dependent upon the water formed by the reaction, the ratio of air to benzene utilized and the moisture content of the inlet air. Each of these factors is variable and interrelated and no range of variation can be given for any one of them, without fixing the others at some definite value. Each of these factors will be considered below, to show its effect on the dew-point of the reacted gas mixture and its content of maleic anhydride and, correspondingly, the range of temperatures at which maleic anhydride may be condensed directly from the gas mixture.

The efficiency of the reaction determines the amount of water-vapor and of maleic anhydride produced in the reaction. From an economic standpoint it is desirable to maintain the efficiency at the highest possible level. I find that it is desirable to do this and, then, considering the efficiency as a fixed variable, control the composition of the reacted gas mixture by adjusting the other variables.

To keep the reaction at the highest level of efficiency I prefer to utilize an efficient catalyst, such as, for example, vanadium oxide deposited on a suitable support, as, for example, aluminum oxide in the form of Alundum, "Tabular Corundum," etc., silica, silicon carbide in the form of Carborundum, etc. The vanadium oxide may, and will, desirably, contain a small quantity of a promoter which may be one of the materials heretofore shown by the art, or which may be a "therapeutic poison," such as, for example, sodium, lithium, barium, magnesium, etc., in small quantities, usually less than 5%, and preferably less than 3%, as more completely disclosed and claimed by the copending application of John M. Weiss, Serial No. 157,675, filed August 6, 1937. The temperature at which the reaction is carried out will ordinarily be within the range of about 300° C. to about 800° C., and preferably within the range of about 550° C. to about 650° C.

The ratio of air to benzene in the original gas mixture controls the amount of moisture introduced into the reaction by air of a given humidity, but is not critical to the efficiency of the reaction as long as it is within broad limits well known to the art. It can be conveniently used to control the composition of the reacted gas mixture, and hence, the range of temperature at which maleic anhydride may be condensed by the method in accordance with this invention.

Recognizing the fact that the working temperature of condensation must be above the dew-point of the exit gases, I have found that the ratio of air to benzene may be expressed with reasonable accuracy, in terms of these several variables:

$$R = \frac{W}{100(He-H)} \quad \text{(Equation 1)}$$

in which

R = ratio of bone-dry air to benzene by weight in the incoming gas mixture.
H = humidity of incoming air in pounds of water per pound of bone-dry air.
He = humidity of exit gas mixture when saturated in pounds of water per pound of bone-dry air.
W = pounds of water formed by reaction and combustion at any given efficiency of reaction per 100 lbs. of benzene.

Of the various variables in the above Equation 1, W can be determined by an analysis of the gas mixture produced by the reaction after it has reached a steady rate, but before adjustment is made to obtain the desired condensation in accordance with this invention. H can be determined by direct physical measurement on the air entering the reaction, and He is determined by fixing a temperature at which the gases are to be condensed and then taking a value for He such that the dew-point of the gas mixture is below the desired condensation temperature.

The ratio of air to benzene will, however, be maintained above the explosive limit, which is about 26 parts by weight of air to 1 part by weight of benzene. This limitation does not, however, prevent the ratio from being conveniently used to control the composition of the reacted gas mixture, since it can be varied over a wide range above the explosive limit. Under conditions of high conversion, that is, with conversions above about 60 pounds of maleic anhydride per 100 pounds of benzene, ratios of the order of several hundred to one may be used, although it will be found that the recovery of maleic anhydride from the gases decreases as the ratio goes up. I prefer, in general, to control ratios within the range of about 26 to about 50.

The humidity of the air used in the original gas mixture is an important factor effecting the amount of water vapor in the reacted gas mixture, and must be taken into consideration in controlling the composition of that mixture. Bone-dry air may, if desired, be used, thus entirely eliminating water from this source. The use of bone-dry air is advantageous in the process in accordance with this invention, but is not necessary and involves the expense of dehumidifying the air. From the standpoint of the economics involved, I usually prefer not to use bone-dry air, but under conditions of high summer humidity, I prefer to use partially dehumidified air obtained by compressing and cooling the air so that the relative humidity of the inlet gases is within the range of about 20 to about 40 per cent at room temperature and atmospheric pressure.

In utilizing the ratio of air to benzene in the incoming gas mixture to control the composition of the reacted gas mixture, both the efficiency of the reaction and the humidity of the original air must be considered, as indicated by the equation given hereinbefore, and will, when crystalline maleic anhydride is desired, be so fixed as to produce a reacted gas mixture which has a dew-point substantially below about 52° C., and a concentration of maleic anhydride in excess of that necessary to saturate the reacted gas mixture at 52° C.

In general, when condensing maleic anhydride as a crystalline solid, I prefer to obtain a reacted gas mixture which has a dew-point of about 25° C. The ratio will preferably be fixed to give a reacted gas mixture containing a maximum concentration of maleic anhydride, with a minimum dew-point. The dew-point will be as low as economically feasible, since it determines the lowest temperature which can be used for the condensation of maleic anhydride in accordance with this invention. The vapor pressure of maleic anhydride drops rapidly with temperature and, hence, the yield of the condensate goes up as the temperature drops.

Although the combination of the ratio of air to benzene and the temperature best adapted for the economical recovery of maleic anhydride may be determined experimentally, I prefer to substitute the values obtained in Equation 1 in Equation 2 given below, which will indicate the approximate yield of maleic anhydride to be obtained from any given set of conditions of condensation.

$$\text{Possible recovery} = 100\left(1 - \frac{RV}{2.25C}\right)$$

(Equation 2)

in which:

Possible recovery = percentage of maleic anhydride actually present in the exit gas mixture which can be condensed by this method.
R = ratio, by weight, of bone-dry air to benzene in incoming gas mixture.
V = vapor pressure of maleic anhydride in mm. at the temperature of condensation.
C = conversion factor expressed as pounds of maleic anhydride per 100 pounds of benzene.

The above equation may be written in the following form to allow the calculation of the actual recovery of maleic anhydride which can be obtained when using a given condenser:

$$\text{Actual recovery} = 100\left(1 - \frac{RV}{2.25C}\right) \text{condenser efficiency}$$

(Equation 3)

in which:

Condenser efficiency = per cent of condensible material actually condensed by the condenser used.

The following examples further illustrate the method in accordance with this invention, and the use of the above equations for fixing the various reaction variables.

Example 1

To a solution of 20 parts of vanadium oxide dissolved in an excess of hydrochloric acid there was added 0.323 part barium nitrate and 150 parts tabular alumina. The moist mass was evaporated to dryness and placed in a converter. A mixture of air and benzene in the ratio of 37 parts of air per part of benzene at 30° C. was passed over the catalyst, which was maintained at a temperature of 550° C. The air used in this example had been dehydrated at room temperature with fused calcium chloride. The gases issuing from the converter were passed into a condenser maintained at an average temperature of 31° C.±2° C. The crystals collected in this cooler were analyzed and found to consist of maleic anhydride of 96% purity based upon titration.

The complete data on the operating conditions and results of this example, in terms of the equations given hereinbefore, are as follows:

$C = 44.7$
$R = 30$
Temperature of condensation = 31° C.
$V = 0.35$ mm.

The theoretical recovery at 100% condenser efficiency calculated by the use of Equation 2 from the data presented is 89.5% whereas the actual recovery is 64.0%.

Example 2

The catalyst and the ratio of air to benzene vapor used in this experiment was identical with the one cited above. The temperature of oxidation was 580° C. and the air used in the oxidation was also dehydrated at room temperature with calcium chloride. The temperature of the crystal condenser was 24° C.±2° C. and the crystals removed consisted of maleic anhydride of 97.2% purity based upon titration. The complete data on the operating conditions and the results of this example are given as follows:

$C = 39$
$R = 37$
Condensation temperature = 24° C.
$V = 0.2$

The theoretical recovery at 100% condenser efficiency in this example is 91.6%, by weight, as calculated by Equation 2, and the actual recovery 62.5% by weight.

Example 3

Twelve and one-half parts of vanadium oxide were suspended on glass wool in the upper part of a Soxhlet apparatus; the lower flask of which contained a mixture of 100 parts of benzene and 7 parts of thionyl chloride. The mixture was heated to boiling and extraction continued for 10 hours. At the end of this time the apparatus was drained and any residual vanadium oxytrichloride in the upper portion of the apparatus dissolved in about 50 parts of alcohol. This mixture was then poured over 100 parts of tabular alumina which had been saturated with water. After all the vanadium in the benzene layer had been associated with the catalyst, the benzene was decanted and the wet residue heated to dryness to complete the deposition of the catalyst and placed in a converter. A mixture of air and benzene in the ratio of about 28 parts of air per part of benzene was passed over the catalyst, which was maintained at a temperature of 580° C. The air used in this example had been dehydrated at room temperature with fused calcium chloride. The gases issuing from the converter were passed into a crystal condenser maintained at an average temperature of 30° C.±2° C. The crystals collected in this cooler were analyzed and found to consist of maleic anhydride of 97.5% purity, based upon titration. The complete data on the operating conditions and results of this example are given as follows:

$$C=55$$
$$R=28.3$$
Condensation temperature$=30°$ C.
$$V=0.35$$

In this example theoretical recovery at 100% condenser efficiency is 91.8% by weight, as calculated by Equation 2 and the actual recovery 72.2% by weight.

*Example 4*

The catalyst used in this experiment was identical with the one cited above in Example 3. A mixture of air and benzene in the ratio of 46.6 parts of air per part of benzene was passed over the catalyst which was maintained at a temperature of 580° C. The air used in this example had been dehydrated at room temperature with fused calcium chloride. The gases issuing from the converter were passed into a crystal condenser maintained at an average temperature of 30° C.±2° C. The crystals collected in this cooler were analyzed and found to consist of maleic anhydride of 98.3% purity. The complete data on the operating conditions and results of this example are given as follows:

$$C=61$$
$$R=46.6$$
Condensation temperature$=30°$ C.
$$V=0.35$$

The theoretical recovery at 100% condenser efficiency in this example is 87.8% by weight, as calculated by Equation 2, and the actual recovery 54.6% by weight.

It will be seen that the above examples illustrate the practical adaptation of this process in accordance with this invention and compares the calculated values for the percentage of the maleic anhydride which can be condensed by my new method under various conditions of operation, with that obtained in actual operation.

It will be understood that the details and examples I have given are by way of illustration and not by way of limitation of the invention as herein described and claimed. While I have based the detailed description of my invention on a procedure in which benzene is oxidized, it will be fully understood that my invention is applicable to any vapor phase oxidation of an organic material to maleic anhydride.

What I claim and desire to protect by Letters Patent is:

1. A method for the production of maleic anhydride which includes contacting an admixture of air and the vapor of a suitable organic compound at an elevated temperature with a catalyst for the partial oxidation of the organic compound to maleic anhydride, the ratio of the air to the organic compound and the water content of the air being in adjustment with respect to the water vapor and maleic anhydride vapor formed in the reaction, to produce a mixture of hot reaction gases in which the moisture content is less than that required for complete saturation of the gas mixture at 52° C., and the maleic anhydride content is greater than that required for complete saturation at the dew-point of the gas mixture, and lowering the temperature of this gas mixture to a temperature below the condensation temperature of maleic anhydride and below its freezing point of about 52° C., but above the dew-point of the gas mixture with respect to water, in the absence of any liquid absorbent for maleic anhydride, thereby directly precipitating maleic anhydride in substantially pure crystalline state.

2. A method for the production of maleic anhydride which includes contacting an admixture of air and the vapor of benzene at an elevated temperature with a catalyst for the partial oxidation of benzene to maleic anhydride, the ratio of the air to the benzene and the water content of the air being in adjustment with respect to the water vapor and maleic anhydride vapor formed in the reaction, to produce a mixture of hot reaction gases in which the moisture content is less than that required for complete saturation of the gas mixture at 52° C., and the maleic anhydride content is greater than that required for complete saturation at the dew-point of the gas mixture, and lowering the temperature of this gas mixture to a temperature below the condensation temperature of maleic anhydride and below its freezing point of about 52° C., but above the dew-point of the gas mixture with respect to water, in the absence of any liquid absorbent for maleic anhydride, thereby directly precipitating maleic anhydride in subtantially pure crystalline state.

JOHN Z. MILLER.